(12) United States Patent
Higman et al.

(10) Patent No.: US 12,069,350 B2
(45) Date of Patent: *Aug. 20, 2024

(54) SURVEILLANCE SYSTEM FOR MOBILE SURVEILLANCE ACCESS TO REMOTE AREAS

(71) Applicant: Serastar Technologies, Inc., Mesa, AZ (US)

(72) Inventors: Gary B. Higman, Mesa, AZ (US); Darren L. Kessner, Phoenix, AZ (US)

(73) Assignee: Serastar Technologies, Inc., Mesa, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/882,510

(22) Filed: Aug. 5, 2022

(65) Prior Publication Data
US 2022/0385791 A1 Dec. 1, 2022

Related U.S. Application Data (63) Continuation-in-part of application No. 17/133,042, filed on Dec. 23, 2020, now Pat. No. 11,457,182.
(Continued)

(51) Int. Cl.
*H04N 23/51* (2023.01)
*H04N 7/18* (2006.01)
*H04N 23/50* (2023.01)

(52) U.S. Cl.
CPC ............. *H04N 23/51* (2023.01); *H04N 7/183* (2013.01); *H04N 23/555* (2023.01)

(58) Field of Classification Search
CPC ...... H04N 23/51; H04N 7/183; H04N 23/555; H04N 7/185; A45C 13/1084; A45C 15/00; A45C 5/00
See application file for complete search history.

(56) References Cited

U.S. PATENT DOCUMENTS

| 6,020,931 A | 2/2000 | Bilbrey |
| 2005/0243922 A1 | 11/2005 | Magee |

(Continued)

OTHER PUBLICATIONS

Li-Fu (720x480 30fps Efficient Prediction Core Chip for Stereo Video Hybrid Coding System—Published in: 2005 IEEE Asian Solid-State Circuits Conference—Doi: 10.1109/ASSCC.2005.251794-0-7803-9162-4/05/@2005 IEEE (Year: 2005).

*Primary Examiner* — Nasim N Nirjhar
(74) *Attorney, Agent, or Firm* — BOOTH UDALL FULLER, PLC (57) ABSTRACT

A surveillance system for mobile surveillance access to remote areas comprising a housing sized to be manually portable, and a power supply, an input port, a video converter, an encoder, and a router all within the housing. The power supply is configured to provide power to the system. The input port is configured to receive a video stream from a camera. The video converter is configured to convert the video stream from a digital signal to an analog signal. The encoder is configured to convert the video stream into a reduced bitrate digital stream having a bitrate less than or equal to 3 megabits per second. The router is configured to transmit the reduced bitrate digital stream over at least two of a plurality of communication paths simultaneously. The system is manually portable and configured to livestream the video stream to the internet in real time.

23 Claims, 4 Drawing Sheets

Related U.S. Application Data which is a continuation-in-part of application No. 15/197,641, filed on Jun. 29, 2016, now abandoned.

(60) Provisional application No. 62/185,875, filed on Jun. 29, 2015.

(56) References Cited

U.S. PATENT DOCUMENTS

| | | |
|---|---|---|
| 2007/0076094 A1 | 4/2007 | Dickerson |
| 2007/0136777 A1* | 6/2007 | Hasek ............... H04N 21/8126 |
| | | 348/E7.071 |
| 2008/0239075 A1 | 10/2008 | Mehrotra |
| 2013/0201316 A1* | 8/2013 | Binder ............... G07C 3/02 |
| | | 701/2 |
| 2014/0132763 A1 | 5/2014 | Billau |
| 2014/0372517 A1 | 12/2014 | Zuili |
| 2015/0213056 A1 | 7/2015 | Maluf |
| 2016/0026192 A1* | 1/2016 | Phillips ............... H04N 7/181 |
| | | 348/143 |
| 2016/0219024 A1 | 7/2016 | Verzun |
| 2016/0241623 A1* | 8/2016 | Zoulias ............... H04L 65/765 |
| 2016/0313147 A1 | 10/2016 | Potter |
| 2018/0034715 A1* | 2/2018 | Nagaraju ............... H04L 43/08 |
| 2018/0198688 A1* | 7/2018 | Dawes ............... G06F 3/0488 |
| 2021/0058399 A1* | 2/2021 | Kapoor ............... H04L 63/102 |

\* cited by examiner

SURVEILLANCE SYSTEM FOR MOBILE SURVEILLANCE ACCESS TO REMOTE AREAS

CROSS REFERENCE TO RELATED APPLICATIONS

This application is a continuation-in-part application of U.S. Utility patent application Ser. No. 17/133,042 entitled "Surveillance System for Mobile Surveillance Access to Remote Areas" to Higman, that was filed on Dec. 23, 2020, which is a continuation-in-part application of U.S. Utility patent application Ser. No. 15/197,641 entitled "Surveillance, Target Acquisition, Reconnaissance System" to Higman, that was filed on Jun. 29, 2016, which claims priority to U.S. Provisional Application 62/185,875 entitled "Surveillance, Target Acquisition, Recon System" to Higman, that was filed on Jun. 29, 2015, the disclosures of which are hereby incorporated herein by this reference.

TECHNICAL FIELD

Aspects of this document relate generally to surveillance systems, and more specifically to surveillance systems capable of providing mobile surveillance access to remote areas.

BACKGROUND

Cameras are commonly used to capture events occurring at a location of interest. Often, the location of interest is not stationary, but moves with an individual as the individual or a specific activity changes location. In addition, the location of interest may be located in remote parts of the world without the availability of typical methods of communication. When individuals have an interest in viewing the events occurring in real time for surveillance purposes, this often is not possible because, while there may be cameras available to capture the events, a reliable method for communicating the video stream in real time to the individuals has not existed.

SUMMARY

Aspects of this document relate to a tactical information transport surveillance system, comprising a housing sized to be manually portable, a power supply within the housing configured to provide power to the surveillance system, an input port configured to communicatively couple with a camera configured to generate a video stream, the input port configured to receive the video stream from the camera, a video converter within the housing communicatively coupled to the input port, wherein the video converter is configured to convert the video stream from a digital signal to an analog signal, at least one encoder within the housing communicatively coupled to the video converter and to the input port, the at least one encoder configured to convert the video stream into a reduced bitrate digital stream having a bitrate less than or equal to 2 megabits per second, a router within the housing and configured to communicatively couple with a plurality of communication paths over which the video stream may be transmitted, and transmit the reduced bitrate digital stream over at least two of the plurality of communication paths simultaneously, and a MANET radio within the housing communicatively coupled to the at least one encoder, wherein the system is manually portable, configured to livestream the video stream to the internet in real time, and configured to function in rugged, remote environments lacking traditional communication networks.

Particular embodiments may comprise one or more of the following features. A SIM card within the housing having a static IP address, wherein the reduced bitrate digital stream is transmitted through the router and made available for viewing on a website based on the IP address. The at least one encoder may implement a codec at least as advanced as H.264 codec to reduce the bitrate of the video stream. An analytics system within the housing configured to receive the video stream in real time and compute and provide analytics on the edge. The plurality of communication paths may comprise at least two of a fiber optic connection, a wireless connection, a DSL connection, a cable connection, a satellite connection, an LTE connection, a cell tower connection, a microwave downlink connection, a Wi-Fi connection, a terrestrial radio connection, and a MANET radio connection. The reduced bitrate digital stream may have a bitrate less than or equal to 1 megabit per second. The printed circuit board may be configured to selectively transmit the video stream to the video converter if the video stream comprises a digital signal or to the at least one encoder if the video stream comprises an analog signal. The reduced bitrate digital stream may be available for viewing on a broadband-connected device that is on the move.

According to an aspect of the disclosure, a tactical information transport surveillance system, may comprise a housing sized to be manually portable, a power supply within the housing configured to provide power to the surveillance system, an input port on the housing configured to communicatively couple with a camera configured to generate a video stream, the input port configured to receive the video stream from the camera, a video converter within the housing operatively coupled to the input port, wherein the video converter is configured to convert the video stream from a digital signal to an analog signal, creating an analog video stream, at least one encoder within the housing and operatively coupled to the video converter and to the input port, the at least one encoder configured to convert the analog video stream into a reduced bitrate digital stream having a bitrate less than or equal to 2 megabits per second, and a router within the housing and configured to communicatively couple with a plurality of communication paths over which the video stream may be transmitted, and transmit the reduced bitrate digital stream over at least two of the plurality of communication paths simultaneously, wherein the plurality of communication paths comprises a cell tower connection and a satellite connection, wherein the system is manually portable and configured to livestream the video stream to the interne in real time.

Particular embodiments may comprise one or more of the following features. A manet radio integrated within the housing and communicatively coupled to the at least one encoder. The printed circuit board may be configured to selectively transmit the video stream to the video converter if the video stream comprises a digital signal or to the at least one encoder if the video stream comprises an analog signal. A SIM card within the housing having a static IP address, wherein the reduced bitrate digital stream is transmitted through the router and made available for viewing on a website based on the IP address. The at least one encoder may implement a codec at least as advanced as H.264 codec to reduce the bitrate of the video stream. An analytics system within the housing configured to receive the video stream in real time and compute and provide analytics on the edge. The plurality of communication paths may comprise at least two of a fiber optic connection, a wireless connection, a DSL connection, a cable connection, a satellite connection, an LTE connection, a cell tower connection, a microwave downlink connection, a Wi-Fi connection, a terrestrial radio connection, and a MANET radio connection. The reduced bitrate digital stream may have a bitrate less than or equal to 1 megabit per second. The reduced bitrate digital stream may be available for viewing on a broadband-connected device that is on the move.

According to an aspect of the disclosure, a tactical information transport surveillance system, comprising a housing configured to be manually portable an input port in the housing configured to communicatively couple with a camera and receive a video stream from the camera, a video converter communicatively coupled to the input port, wherein, if the video stream comprises a digital signal, the video converter is configured to convert the digital signal to an analog signal, at least one encoder communicatively coupled to the video converter, the at least one encoder configured to convert the analog video stream into a reduced bitrate digital stream having a bitrate less than or equal to 2 megabits per second, a router configured to communicatively couple with a plurality of communication paths over which the video stream may be simultaneously transmitted, and a power supply configured to provide power to the input port, the video converter, the at least one encoder, and the router, wherein the housing contains each of the video converter, the at least one encoder, the router, and the power supply.

Particular embodiments may comprise one or more of the following features. A manet radio integrated within the housing and communicatively coupled to the at least one encoder. A SIM card within the housing having a static IP address, wherein the reduced bitrate digital stream is transmitted through the router and made available for viewing on a website based on the IP address. The at least one encoder may implement a codec at least as advanced as H.264 codec to reduce the bitrate of the video stream. An analytics system within the housing configured to receive the video stream in real time and compute and provide analytics on the edge. The plurality of communication paths may comprise at least two of a fiber optic connection, a wireless connection, a DSL connection, a cable connection, a satellite connection, an LTE connection, a cell tower connection, a microwave downlink connection, a Wi-Fi connection, a terrestrial radio connection, and a MANET radio connection. The reduced bitrate digital stream may have a bitrate less than or equal to 1 megabit per second. The reduced bitrate digital stream may be available for viewing on a broadband-connected device that is on the move.

Aspects of this document relate to a tactical information transport surveillance system for mobile surveillance access to remote areas, comprising a housing sized to be manually portable, the housing having an antenna built into the housing and a latch configured to lock the housing in a closed position, wherein the system is contained within the housing when the housing is in the closed position, a battery within the housing configured to provide power to the surveillance system, a printed circuit board within the housing operatively coupled to the battery and to the antenna, the printed circuit board configured to communicatively couple with a camera configured to generate a video stream, the printed circuit board having an input port configured to receive the video stream from the camera, and a video converter and an encoder both within the housing and operatively coupled to the printed circuit board, wherein the printed circuit board is configured to selectively transmit the video stream to the video converter if the video stream comprises a digital signal or to the encoder if the video stream comprises an analog signal, wherein the video converter is configured to receive the video stream from the printed circuit board, convert the video stream from a digital signal to an analog signal, and pass the analog video stream to the encoder, and wherein the encoder is operatively coupled to the video converter and configured to receive the analog video stream from the printed circuit board or from the video converter and convert the analog video stream using an H.264 or H.265 codec into a reduced bitrate digital stream having a bitrate less than or equal to 2 megabits per second, a router within the housing operatively coupled to the encoder and the antenna, wherein the router is configured to communicatively couple with a plurality of communication paths over which the video stream may be transmitted, and transmit the reduced bitrate digital stream over each of the plurality of communication paths simultaneously, wherein the plurality of communication paths comprises at least a cell tower connection, a satellite connection, and a MANET radio connection, a SIM card within the housing having a static IP address, wherein the reduced bitrate digital stream is transmitted through the router, passed through a streaming engine software, and made available for viewing on a website based on the IP address, and an analytics system within the housing configured to receive the video stream in real time and compute and provide analytics on the edge, wherein the system is manually portable, configured to livestream the video stream to the internet in real time, and configured to function in rugged, remote environments.

Particular embodiments may comprise one or more of the following features. The plurality of communication paths may further comprise at least one of a fiber optic connection, a wireless connection, a DSL connection, a cable connection, an LTE connection, a microwave downlink connection, a terrestrial radio connection, and a Wi-Fi connection. The plurality of communication paths may further comprise a fiber optic connection, a wireless connection, a DSL connection, a cable connection, an LTE connection, a microwave downlink connection, and a Wi-Fi connection. The reduced bitrate digital stream may have a bitrate less than or equal to 1 megabit per second.

According to another aspect, a tactical information transport surveillance system for mobile surveillance access to remote areas may comprise a housing sized to be manually portable, the housing having an antenna built into the housing, a battery within the housing configured to provide power to the surveillance system, a printed circuit board within the housing operatively coupled to the battery and to the antenna, the printed circuit board configured to communicatively couple with a camera configured to generate a video stream, the printed circuit board having an input port configured to receive the video stream from the camera, and a video converter and an encoder both within the housing and operatively coupled to the printed circuit board, wherein the printed circuit board is configured to selectively transmit the video stream to the video converter if the video stream comprises a digital signal or to the encoder if the video stream comprises an analog signal, wherein the video converter is configured to convert the video stream from a digital signal to an analog signal, creating an analog video stream, and the encoder is configured to convert the analog video stream into a reduced bitrate digital stream having a bitrate less than or equal to 2 megabits per second, a router within the housing and configured to communicatively couple with a plurality of communication paths over which the video stream may be transmitted, and transmit the reduced bitrate digital stream over each of the plurality of communication paths simultaneously, wherein the plurality of communication paths comprises a cell tower connection and a satellite connection, a SIM card within the housing having a static IP address, wherein the reduced bitrate digital stream is transmitted through the router and made available for viewing on a website based on the IP address, and wherein the system is manually portable and configured to livestream the video stream to the interne in real time.

Particular implementations may comprise one or more of the following features. The encoder may implement an H.264 or H.265 codec to reduce the bitrate of the video stream. The router may be operatively coupled to the antenna, wherein the router is configured to communicate with the plurality of communication paths and transmit the video stream over each of the plurality of communication paths through the antenna. An analytics system within the housing configured to receive the video stream in real time and compute and provide analytics on the edge. The system may be contained within the housing. The plurality of communication paths may further comprise at least one of a fiber optic connection, a wireless connection, a DSL connection, a cable connection, an LTE connection, a microwave downlink connection, a Wi-Fi connection, a terrestrial radio connection, and a MANET radio connection. The housing may have a latch configured to lock the housing in a closed position. The reduced bitrate digital stream may have a bitrate less than or equal to 1 megabit per second.

According to another aspect, a tactical information transport surveillance system for mobile surveillance access to remote areas may comprise a housing sized to be manually portable, a power supply within the housing configured to provide power to the surveillance system, an input port configured to communicatively couple with a camera configured to generate a video stream, the input port configured to receive the video stream from the camera, a video converter within the housing communicatively coupled to the input port, wherein the video converter is configured to convert the video stream from a digital signal to an analog signal, an encoder within the housing communicatively coupled to the video converter and to the input port, the encoder configured to convert the video stream into a reduced bitrate digital stream having a bitrate less than or equal to 2 megabits per second, and a router within the housing and configured to communicatively couple with a plurality of communication paths over which the video stream may be transmitted, and transmit the reduced bitrate digital stream over at least two of the plurality of communication paths simultaneously, wherein the system is manually portable and configured to livestream the video stream to the interne in real time.

Particular embodiments may comprise one or more of the following features. A SIM card within the housing having a static IP address, wherein the reduced bitrate digital stream is transmitted through the router and made available for viewing on a website based on the IP address. The router may be configured to transmit the reduced bitrate digital stream over each of the plurality of communication paths simultaneously. The encoder may implement an H.264 or H.265 codec to reduce the bitrate of the video stream. An analytics system within the housing configured to receive the video stream in real time and compute and provide analytics on the edge. The plurality of communication paths comprises a broadband connection. The broadband connection may be one of a fiber optic connection, a wireless connection, a DSL connection, a cable connection, a satellite connection, an LTE connection, a cell tower connection, a microwave downlink connection, a Wi-Fi connection, a terrestrial radio connection, and a MANET radio connection. The reduced bitrate digital stream may have a bitrate less than or equal to 1 megabit per second.

The foregoing and other aspects, features, applications, and advantages will be apparent to those of ordinary skill in the art from the specification, drawings, and the claims. Unless specifically noted, it is intended that the words and phrases in the specification and the claims be given their plain, ordinary, and accustomed meaning to those of ordinary skill in the applicable arts. The inventors are fully aware that he can be his own lexicographer if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements, and.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of implementations that are described in many different forms, there is shown in the drawings and will herein be described in detail particular implementations with the understanding that the present disclosure is to be considered as an exemplification of the principles of the disclosed methods and systems, and is not intended to limit the broad aspect of the disclosed concepts to the implementations illustrated.

In the following description, reference is made to the accompanying drawings which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure. As will become apparent, changes may be made in the function and/or arrangement of any of the elements described in the disclosed exemplary implementations without departing from the spirit and scope of this disclosure.

The present disclosure relates to a tactical information transport surveillance system 100 which is configured to livestream a video to the internet in real time from any location, regardless of the remoteness of the location. The surveillance system 100 is manually portable to allow the user to livestream events, even as the events being viewed change location. For example, a user may be participating in a field operation in a remote location. The user may drive a ground vehicle for a portion of the operation, then walk for a couple of minutes, and then board a helicopter. Throughout this activity, the user can have the surveillance system 100 livestreaming video taken from a camera on the ground vehicle, a body cam, and a camera mounted to the helicopter. Each camera simply plugs into the surveillance system 100 and the system 100 communicates the video from the camera to the internet. Any camera can be used because the surveillance system 100 does not require any specific connection or proprietary hardware to connect to the system 100 or to view the video stream on the internet. Additionally, the video stream can be viewed on any broadband-connected device, regardless of the location of the device. Thus, the device may be on the move, moving from one location to another, and still be able to stream the video. On the move may mean that the device is moving within a vehicle, being carried by a user, or any other mode of movement by which a device can be moved. As a result, the target being filmed can be on the move, the surveillance system 100 following the target can be on the move while capturing the video and streaming an encrypted signal, and the command center reviewing the encrypted video can also be on the move.

Figure 1:
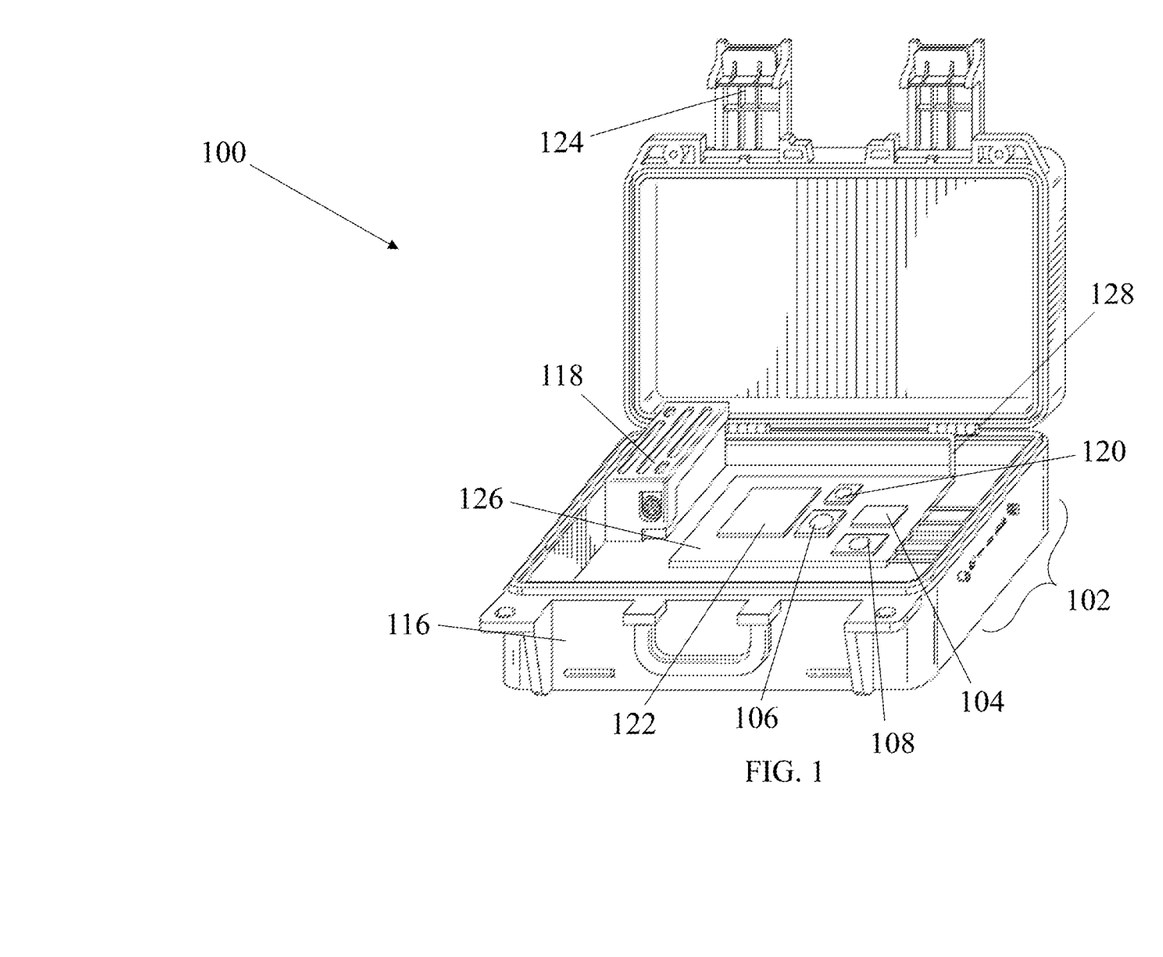
FIG. 1 is a perspective view of an embodiment of the surveillance system with the housing in an open position.

FIG. 1 illustrates one embodiment of the surveillance system 100. The surveillance system 100 comprises an input port 102, a video converter 104, an encoder 106, and a router 108. The input port 102 is configured to communicatively couple with a camera 110 or other source of a video stream (see FIG. 3), which is configured to generate a video stream. As used herein, video stream is intended to include any form of video, audio-visual, or other data stream that needs to be transmitted. The surveillance system 100 may be configured to implement voice over internet protocol (VOIP) to transmit the data stream as well. The video stream is communicated to the input port 102, which receives the video stream into the surveillance system 100. The input port 102 is configured to receive the video stream in any format. For example, the input port 102 may comprise one or more of a coaxial cable port, a HDMI port, a mini-HDMI port, a micro-HDMI port, an ethernet port, a composite video port, and an analog port, and is configured to receive and interpret file formats of many different types known in the industry. Additional ports may be included to facilitate connecting different types of cables. The video stream may comprise a plurality of video inputs. For example, two separate cameras 110 may be coupled with the input port 102, with two sets of video data being received into the system 100. The surveillance system 100 is configured to livestream both of these sets of video data within the video stream. The video converter 104 is configured to convert the video stream into an analog signal. However, if the video stream entering the surveillance system 100 is already an analog signal, the video converter 104 does not interact with the video stream. Algorithms to convert a video stream from digital to analog and analog to digital are well known in the art and any that meet the bandwidth characteristics for a particular system design are acceptable. The encoder 106 receives the analog video stream, either from the video converter 104 or directly from the input port 102. The encoder 106 is configured to convert the analog video stream into a reduced bitrate digital stream. A H.264 or H.265 codec, for example, have been found to work particularly well for the above-described implementations. Alternatively, one with at least a comparable bitrate reduction to H.264 or H.265 may be implemented within the encoder 106 to reduce the bitrate of the video stream.

Figure 3:
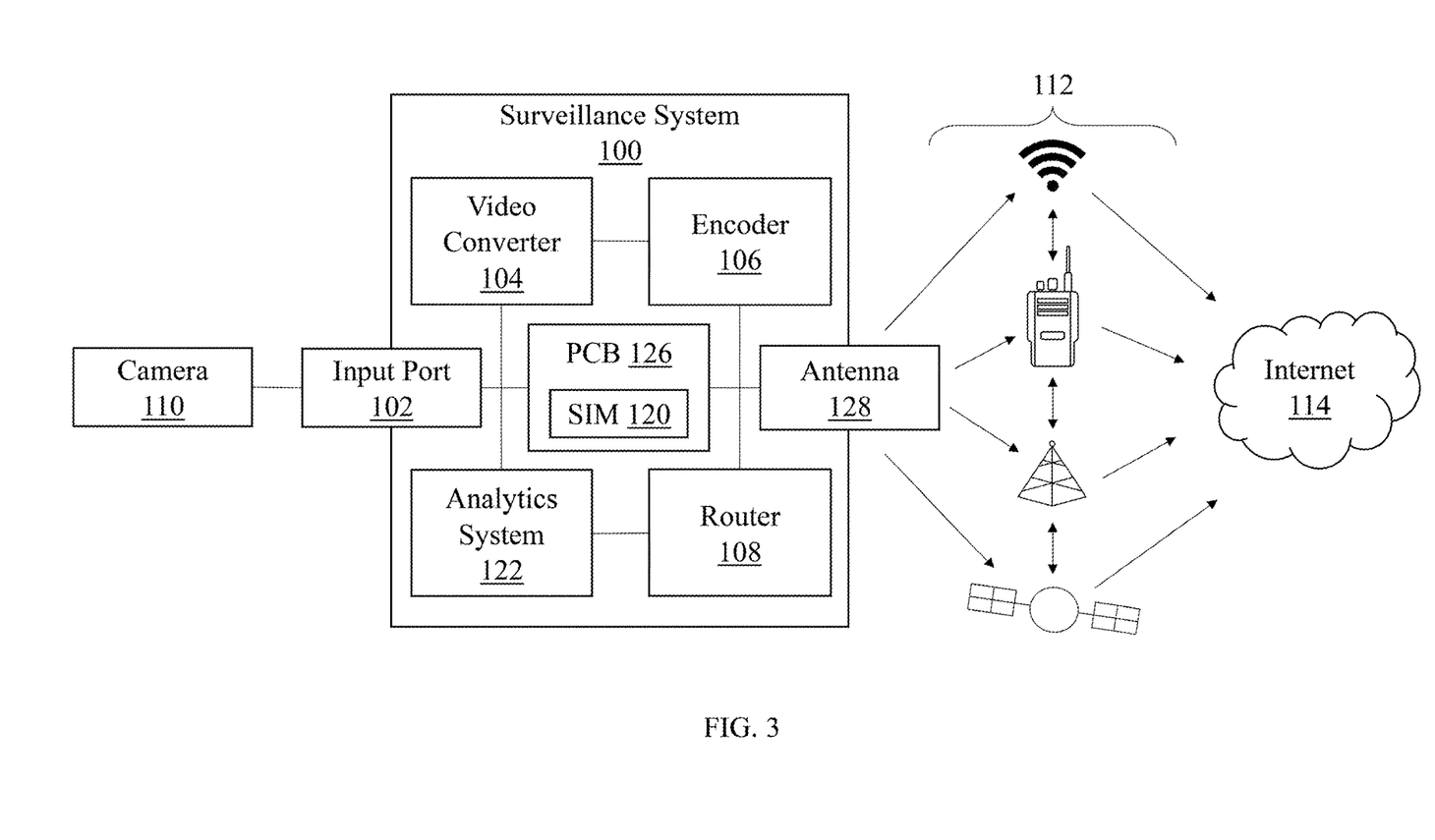
FIG. 3 is a schematic illustrating the electrical components of the surveillance system shown in FIG. 1.

The router 108 is configured to communicatively couple with a plurality of communication paths 112, as shown in FIG. 3. The plurality of communication paths 112 all provide paths for the reduced bitrate digital stream to be livestreamed to the internet 114. The router 108 may also be configured to transmit the reduced bitrate digital stream over at least two of the plurality of communication paths 112 simultaneously. Alternatively, the router 108 may be configured to transmit the reduced bitrate digital stream over each of the plurality of communication paths 112 simultaneously. By transmitting the video stream over multiple communication paths 112 at once, the surveillance system 100 finds the quickest path to the internet 114 without significant delays. Once the video stream is on the internet 114, any global broadband connected device, such as a tablet, computer, or phone, may be configured to view the stream without using any proprietary hardware or software. Any number of users may be able to view the video stream simultaneously. In addition to processing and transmitting the video stream, the surveillance system 100 may also locally record the live stream. Recording the live stream may be for buffering purposes, or to store the live stream for later access or historical storage purposes.

The reduced bitrate digital stream may have a bitrate less than or equal to 3 megabits per second. In some embodiments, the bitrate is less than or equal to 2 megabits per second, or less than or equal to 1 megabit per second. The quality of a video stream is affected by the bitrate, the resolution, and the framerate. Each of these factors also affects the processing power required to encode the video stream and the amount of bandwidth required to broadcast the video stream. The following table details typical recommended settings for different resolutions.

| Name | Resolution | Link (Mbps) | Bitrate (Mbps) | Video (kbps) | Audio (kbps) |
| --- | --- | --- | --- | --- | --- |
| 240p | 424 × 240 | 1.0 | 0.64 | 576 | 64 |
| 360p | 640 × 360 | 1.5 | 0.96 | 896 | 64 |
| 432p | 768 × 432 | 1.8 | 1.15 | 1088 | 64 |
| 480p | 848 × 480 | 2.0 | 1.28 | 1216 | 64 |
| 480p HQ | 848 × 480 | 2.5 | 1.60 | 1536 | 64 |
| 576p | 1024 × 576 | 3.0 | 1.92 | 1856 | 64 |
| 576p HQ | 1024 × 576 | 3.5 | 2.24 | 2176 | 64 |
| 720p | 1280 × 720 | 4.0 | 2.56 | 2496 | 64 |
| 720p HQ | 1280 × 720 | 5.0 | 3.20 | 3072 | 128 |
| 1080p | 1920 × 1080 | 8.0 | 5.12 | 4992 | 128 |
| 1080p HQ | 1920 × 1080 | 12.0 | 7.68 | 7552 | 128 |
| 1080p Superbit | 1920 × 1080 | N/A | 20.32 | 20000 | 320 |

The reduced bitrate digital stream departs from these typical recommended settings by decreasing the required video bitrate. For example, if a 720p resolution is selected, the table recommends a video bitrate of 2496 kilobits per second, or 2.496 megabits per second. The reduced bitrate digital stream for a 720p resolution has a smaller bitrate at a bitrate of less than or equal to 2 megabits per second, or a bitrate of less than or equal to 1 megabit per second, or a bitrate of less than or equal to 575 kilobits per second. The smaller bitrate of the reduced bitrate digital stream allows the stream to be communicated over more communication paths 112 than would otherwise be available. For example, the surveillance system 100 may be used in a location with only one bar of cell service. Typically, this is not enough bandwidth to transmit a video in real time. However, the reduced bitrate digital stream can be transmitted using that cell service as a result of the smaller bitrate. Because more communication paths 112 are available to the surveillance system 100, the surveillance system 100 is capable of livestreaming video in situations in which most devices cannot.

The relationship between resolution and bitrate is also affected by the codec used. In surveillance systems 100 with an encoder 106 using a H.264 codec, the reduced bitrate digital stream may have a bitrate less than or equal to 4 megabits per second. As already stated, bitrates of less than or equal to 3 megabits per second, 2 megabits per second, 1 megabit per second, and 575 kilobits per second may also be used. In some embodiments, the bitrate may get as low as 256 kilobits per second, or even lower. On the other hand, in surveillance systems 100 with an encoder 106 using a H.265 codec, a greater range of bitrates are possible, even up to 40 megabits. In addition, all of the bitrates mentioned in relation to the encoder 106 with the H.264 codec may be used with the encoder 106 with the H.265 codec. An encoder 106 with a H.265 codec can create a reduced bitrate digital stream with a much smaller bitrate than an encoder 106 with a H.264 codec without impacting the resolution of the video stream. For example, the reduced bitrate digital stream created by an encoder 106 with a H.265 codec could have a bitrate of as low as 64 kilobits per second, 50 kilobits per second, or even lower, while maintaining a high quality video stream. Other encoders 106, such as an encoder 106 implementing a H.266 codec, or other codec, may alternatively be used. Thus, the encoder 106 may implement a codec at least as advanced as H.264 to reduce the bitrate of the video stream. As additional codecs are developed, these may also be implemented.

The plurality of communication paths 112 may comprise a broadband connection. The broadband connection may be one of a fiber optic connection, a wireless connection, a digital subscriber line (DSL) connection, a cable connection, a satellite connection, a long-term evolution (LTE) connection, a cell tower connection, a microwave downlink connection, a Wi-Fi connection, a terrestrial radio connection, and a MANET radio connection. The terrestrial radio connection may be television white space. The plurality of communication paths 112 may comprise all of the foregoing connections, or a selection of the foregoing connections. For some embodiments, the plurality of communication paths 112 may additionally comprise one or more of a HAM radio connection and a low-grade satellite connection.

Returning to FIG. 1, the surveillance system 100 may also comprise a housing 116 and a power supply 118 such as a battery. The power supply 118 is configured to supply power to the surveillance system 100. The surveillance system 100 may be configured to plug into an external power source. The surveillance system 100 may also be configured to power other devices using the power supply 118, and may be capable of supplying 5 volts, 12 volts, and 24 volts. The housing 116 is sized to be manually portable. The video converter 104, the encoder 106, the router 108, and the power supply 118 may all be within the housing, with the surveillance system 100 contained within the housing 116. Thus, the surveillance system 100 can be carried by a single user. The surveillance system 100 may also comprise a SIM card 120 within the housing 116. The SIM card 120 may be associated with a static IP address, which allows the reduced bitrate digital stream to be transmitted through the router 108 and made available for viewing on a website based on the IP address. Thus, an interested party can view the livestream in any location that has access to the internet. Additionally, the surveillance system 100 may comprise an analytics system 122 within the housing 116. The analytics system 122 includes a processor and software and is configured to receive the video stream in real time and compute and provide analytics on the edge. This enables on-the-edge processing of the video stream, where the video stream is processed locally instead of being processed after transmission. For example, a field operation may be looking for a specific individual. The surveillance system 100 that has the analytics system 122 is capable of searching the video stream for that individual on the spot, instead of transmitting the video stream elsewhere to have it processed. This makes the data within the video stream much more valuable because the data can be made available and actionable immediately, instead of waiting for processing to take place elsewhere.

Figure 2:
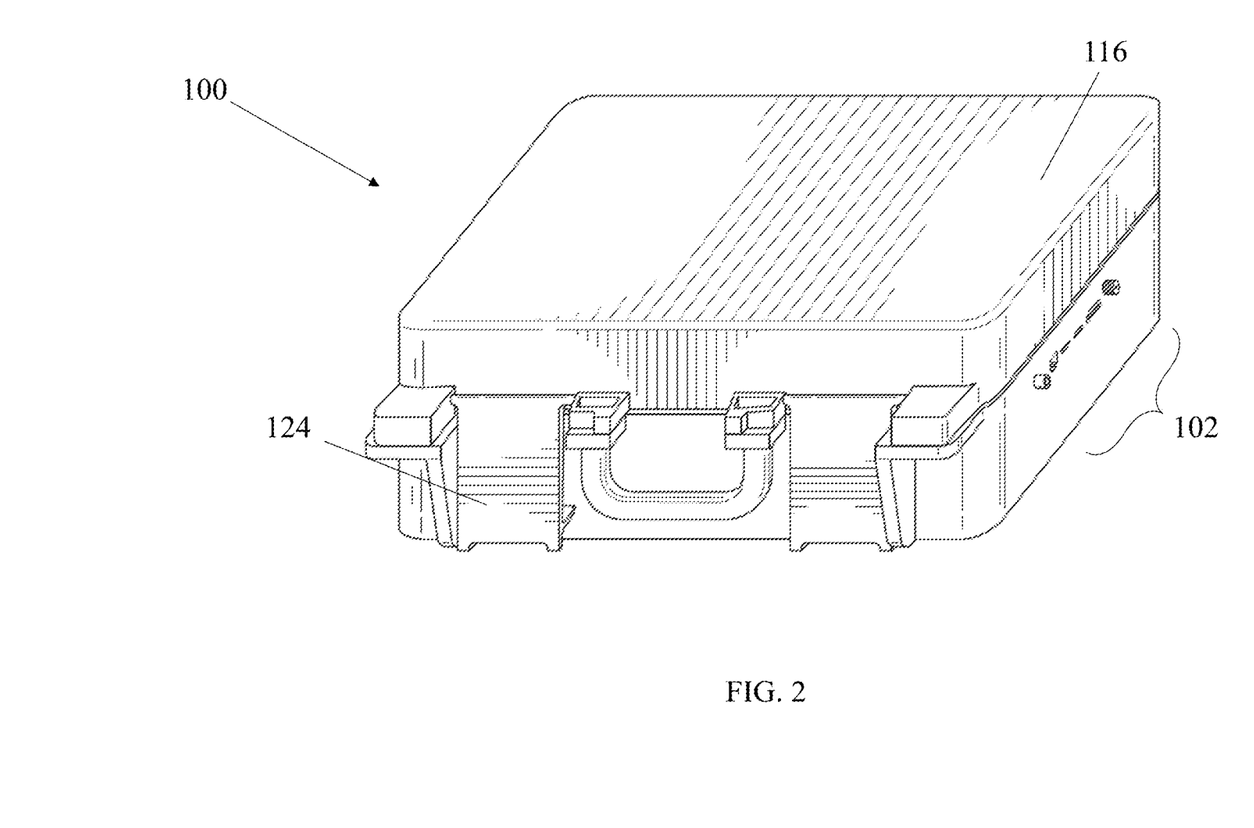
FIG. 2 is a perspective view of the surveillance system shown in FIG. 1 with the housing in a closed position.

In some embodiments, the housing 116 has an open position and a closed position. When in the open position, shown in FIG. 1, the components of the surveillance system 100 are accessible. When in the closed position, shown in FIG. 2, the components of the surveillance system 100 are enclosed within the housing 116. However, the input port 102 is still accessible when the housing 116 is in the closed position. This allows the surveillance system 100 to connect to a camera 110 and function without requiring the housing 116 to be in the open position. In other embodiments, the housing 116 is not configured to be opened. For embodiments having the open position and the closed position, the housing 116 may have a latch 124 configured to lock the housing 116 in the closed position.

In particular embodiments, the surveillance system 100 further comprises a printed circuit board (PCB) 126 within the housing 116. In such embodiments, the PCB 126 is the hub of the electrical components, as shown in FIG. 3. Therefore, the PCB 126 is operatively coupled to the power supply 118 and the input port 102. Additionally, the video converter 104 and the encoder 106 are operatively coupled to the PCB 126. The PCB 126 may be configured to selectively transmit the video stream coming in through the input port 102 to the video converter 104 if the video stream comprises a digital signal or to the encoder 106 if the video stream comprises an analog signal.

The housing 116 may have an antenna 128 operatively coupled to the router 108. The router 108 may be configured to transmit the video stream over each of the plurality of communication paths 112 through the antenna 128. The antenna 128 may be built into the housing 116. Alternatively, the antenna 128 may be contained within the housing 116, or may extend out of the housing 116. In a particular embodiment, the housing may also have a MANET radio within the housing that is communicatively coupled to the encoder 106 to enable communication for the surveillance system through a MANET radio network.

Figure 4:
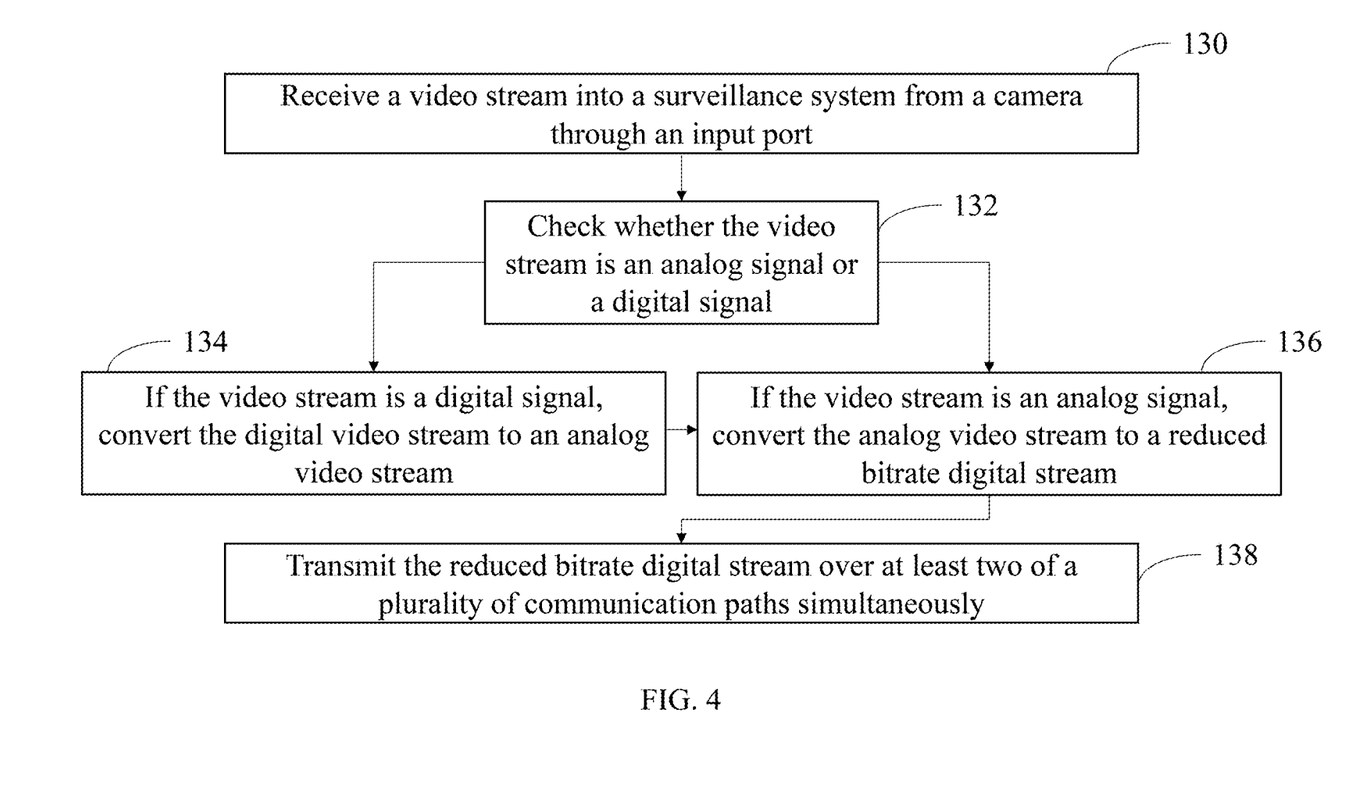
FIG. 4 is a process flow chart illustrating the steps of transmitting a video stream to the internet using the surveillance system shown in FIG. 1

As shown in FIG. 4, a method for transmitting a video stream to grant mobile surveillance access to remote areas may comprise a first step 130 of receiving a video stream into the surveillance system 100 from a camera 110 through the input port 102, a second step 132 of checking whether the video stream is an analog signal or a digital signal, a third step 134 of converting the video stream to an analog video stream if the video stream is a digital signal, a fourth step 136 of converting the analog video stream to a reduced bitrate digital stream, and a fifth step 138 of transmitting the reduced bitrate digital stream over at least two of the plurality of communication paths 112 simultaneously.

As a result of the ability of the surveillance system 100 to communicate with the plurality of communication paths 112, the surveillance system 100 is configured to maintain at least one connection to the interne regardless of the location of the surveillance system 100. In addition, as a result of the low bitrate of the surveillance system 100, the surveillance system 100 is configured to livestream the video entering the surveillance system 100 from any location. These features allow the surveillance system 100 to be useful in a variety of situations. For example, the surveillance system 100 can be used to provide video data regarding a field operation to an interested party even if the field operation is occurring in a remote location which lacks typical communication abilities such as cell service or wi-fi, and the interested party is not present. Additionally, the interested party can receive and view the video stream, even as the field operation changes location, and/or as the interested party is on the move. As explained above, the surveillance system 100 is configured to receive a video stream from any type of camera 110 through the input port 102, and the surveillance system 100 can be carried by hand to communicate video data about events even as the events change location. Thus, different cameras 110 can be connected and disconnected whenever needed. As another example, a first responder may respond to a reported emergency with the surveillance system 100 attached to a body cam. Because the video can be viewed on the internet, an individual can watch as the first responder investigates the situation, and can call in back up, provide information to the first responder, or provide instructions to the first responder as the situation develops. This allows the first responder to simply focus on what is happening without having to worry about when and how to call in back up. In addition, this keeps the first responder up to date on all the information currently known about the situation. As another example, firefighters may be fighting a forest fire away from the city, where cell service is less effective. Each team of firefighters may have a surveillance system 100 which communicates video data about the situation where the team is located. This allows those directing the firefighting to personally observe the situation and make decisions based on more complete information, even as those directing the firefighting and those fighting the fire are both on the move.

The surveillance system 100 is configured to utilize the global positioning system (GPS) for locational services and geofencing. In addition, the surveillance system 100 is configured to process KLV multicast data.

It will be understood that implementations of a surveillance system are not limited to the specific assemblies, devices and components disclosed in this document, as virtually any assemblies, devices and components consistent with the intended operation of a surveillance system may be used. Accordingly, for example, although particular surveillance systems, and other assemblies, devices and components are disclosed, such may include any shape, size, style, type, model, version, class, measurement, concentration, material, weight, quantity, and/or the like consistent with the intended operation of surveillance systems. Implementations are not limited to uses of any specific assemblies, devices and components; provided that the assemblies, devices and components selected are consistent with the intended operation of a surveillance system.

Accordingly, the components defining any surveillance system implementations may be formed of any of many different types of materials or combinations thereof that can readily be formed into shaped objects provided that the components selected are consistent with the intended operation of a surveillance system implementation. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, nickel, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof. In instances where a part, component, feature, or element is governed by a standard, rule, code, or other requirement, the part may be made in accordance with, and to comply under such standard, rule, code, or other requirement.

Various surveillance systems may be manufactured using conventional procedures as added to and improved upon through the procedures described here. Some components defining a surveillance system may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that surveillance systems are not limited to the specific order of steps as disclosed in this document. Any steps or sequence of steps of the assembly of a surveillance system indicated herein are given as examples of possible steps or sequence of steps and not as limitations, since various assembly processes and sequences of steps may be used to assemble surveillance systems.

The implementations of a surveillance system described are by way of example or explanation and not by way of limitation. Rather, any description relating to the foregoing is for the exemplary purposes of this disclosure, and implementations may also be used with similar results for a variety of other applications employing a surveillance system.

What is claimed is:

1. A tactical information transport surveillance system, comprising:
    a housing sized to be manually portable;
    a power supply within the housing configured to provide power to the surveillance system;
    an input port configured to communicatively couple with a camera configured to generate a video stream, the input port configured to receive the video stream from the camera;
    a video converter within the housing communicatively coupled to the input port, wherein the video converter is configured to convert the video stream from a digital signal to an analog signal;
    at least one encoder within the housing communicatively coupled to the video converter and to the input port, the at least one encoder configured to convert the video stream into a reduced bitrate digital stream having a bitrate less than or equal to 2 megabits per second and a resolution of at least 720p;
    a router within the housing configured to communicatively couple with a plurality of communication paths over which the video stream may be transmitted, and transmit the reduced bitrate digital stream to the internet over a first communication path of the plurality of communication paths, and simultaneously transmit the reduced bitrate digital stream over a second communication path of the plurality of communication paths, wherein the first communication path is of a communication path type different from a communication path type of the second communication path; and
    a MANET radio within the housing communicatively coupled to the at least one encoder;
    wherein each component of the system, including the power supply, the video converter, the at least one encoder, the router, and the MANET radio, is housed within the housing; and
    wherein the system is manually portable and configured to livestream the video stream to the internet in real time while located in rugged, remote environments lacking traditional communication networks.

2. The system of claim 1, further comprising a SIM card within the housing having a static IP address, wherein the reduced bitrate digital stream is transmitted through the router and made available for viewing on a website based on the IP address.

3. The system of claim 1, wherein the at least one encoder implements a codec at least as advanced as H.264 codec to reduce the bitrate of the video stream.

4. The system of claim 1, further comprising an analytics system within the housing configured to receive the video stream in real time and compute and provide analytics on the edge.

5. The system of claim 1, wherein the plurality of communication paths comprises the first communication path type and the second communication path type among a plurality of different communication path types including at least two of a fiber optic connection, a wireless connection, a DSL connection, a cable connection, a satellite connection, an LTE connection, a cell tower connection, a microwave downlink connection, a Wi-Fi connection, a terrestrial radio connection, and a MANET radio connection.

6. The system of claim 1, wherein the reduced bitrate digital stream has a bitrate less than or equal to 1 megabit per second.

7. The system of claim 1, wherein the printed circuit board is configured to selectively transmit the video stream to the video converter if the video stream comprises a digital signal or to the at least one encoder if the video stream comprises an analog signal.

8. The system of claim 1, wherein the reduced bitrate digital stream is available for viewing on a broadband-connected device that is on the move.

9. A tactical information transport surveillance system, comprising:
   a housing sized to be manually portable;
   a power supply within the housing configured to provide power to the surveillance system;
   an input port on the housing configured to communicatively couple with a camera configured to generate a video stream, the input port configured to receive the video stream from the camera;
   a video converter within the housing operatively coupled to the input port, wherein the video converter is configured to convert the video stream from a digital signal to an analog signal, creating an analog video stream;
   at least one encoder within the housing and operatively coupled to the video converter and to the input port, the at least one encoder configured to convert the analog video stream into a reduced bitrate digital stream having a bitrate less than or equal to 2 megabits per second and a resolution of at least 720p;
   a MANET radio within the housing communicatively coupled to the at least one encoder; and
   a router within the housing configured to communicatively couple with a plurality of communication paths over which the video stream may be transmitted, and transmit the reduced bitrate digital stream to the internet over a first communication path of the plurality of communication paths, and simultaneously transmit the reduced bitrate digital stream over a second communication path of the plurality of communication paths, wherein the first communication path is of a communication path type different from a communication path type of the second communication path, wherein the plurality of communication paths comprises a cell tower connection and a satellite connection;
   wherein each component of the system, including the power supply, the video converter, the at least one encoder, and the router, is housed within the housing; and
   wherein the system is manually portable and configured to livestream the video stream to the internet in real time while located in rugged, remote environments lacking traditional communication networks.

10. The system of claim 9, wherein the printed circuit board is configured to selectively transmit the video stream to the video converter if the video stream comprises a digital signal or to the at least one encoder if the video stream comprises an analog signal.

11. The system of claim 9, further comprising a SIM card within the housing having a static IP address, wherein the reduced bitrate digital stream is transmitted through the router and made available for viewing on a website based on the IP address.

12. The system of claim 9, wherein the at least one encoder implements a codec at least as advanced as H.264 codec to reduce the bitrate of the video stream.

13. The system of claim 9, further comprising an analytics system within the housing configured to receive the video stream in real time and compute and provide analytics on the edge.

14. The system of claim 9, wherein the plurality of communication paths comprises the first communication path type and the second communication path type among a plurality of different communication path types including at least two of a fiber optic connection, a wireless connection, a DSL connection, a cable connection, a satellite connection, an LTE connection, a cell tower connection, a microwave downlink connection, a Wi-Fi connection, a terrestrial radio connection, and a MANET radio connection.

15. The system of claim 9, wherein the reduced bitrate digital stream has a bitrate less than or equal to 1 megabit per second and a resolution of at least 720p.

16. The system of claim 9, wherein the reduced bitrate digital stream is available for viewing on a broadband-connected device that is on the move.

17. A tactical information transport surveillance system, comprising:
   a housing configured to be manually portable;
   an input port in the housing configured to communicatively couple with a camera and receive a video stream from the camera;
   a video converter communicatively coupled to the input port, wherein, if the video stream comprises a digital signal, the video converter is configured to convert the digital signal to an analog signal;
   at least one encoder communicatively coupled to the video converter, the at least one encoder configured to convert the analog video stream into a reduced bitrate digital stream having a bitrate less than or equal to 2 megabits per second and a resolution of at least 720p;
   a MANET radio integrated within the housing and communicatively coupled to the at least one encoder;
   a router configured to communicatively couple with a plurality of communication path types over which the video stream may be simultaneously transmitted; and
   a power supply configured to provide power to the input port, the video converter, the at least one encoder, and the router;
   wherein the housing contains each of the video converter, the at least one encoder, the router, and the power supply; and
   wherein the system is manually portable and configured to livestream the video stream to the internet in real time while located in rugged, remote environments lacking traditional communication networks.

18. The system of claim 17, further comprising a SIM card within the housing having a static IP address, wherein the reduced bitrate digital stream is transmitted through the router and made available for viewing on a website based on the IP address.

19. The system of claim 17, wherein the at least one encoder implements a codec at least as advanced as H.264 codec to reduce the bitrate of the video stream.

20. The system of claim 17, further comprising an analytics system within the housing configured to receive the video stream in real time and compute and provide analytics on the edge.

21. The system of claim 17, wherein the plurality of communication path types comprises at least two of a fiber optic connection, a wireless connection, a DSL connection, a cable connection, a satellite connection, an LTE connection, a cell tower connection, a microwave downlink connection, a Wi-Fi connection, a terrestrial radio connection, and a MANET radio connection.

22. The system of claim 17, wherein the reduced bitrate digital stream has a bitrate less than or equal to 1 megabit per second.

23. The system of claim 17, wherein the reduced bitrate digital stream is available for viewing on a broadband-connected device that is on the move.

* * * * *